Jan. 11, 1966 A. H. ROSENTHAL 3,228,246
PRESSURE MEASURING DEVICE
Filed April 18, 1963 2 Sheets-Sheet 1
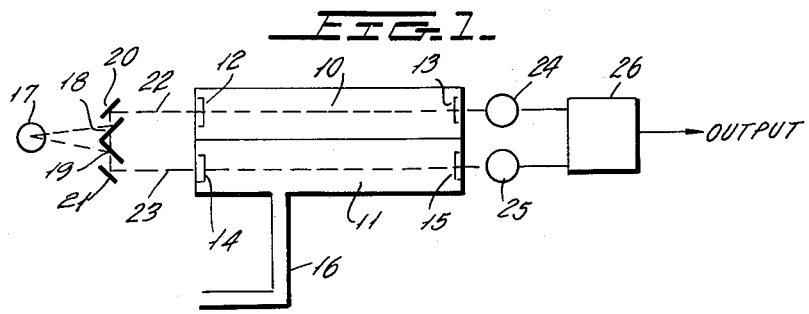
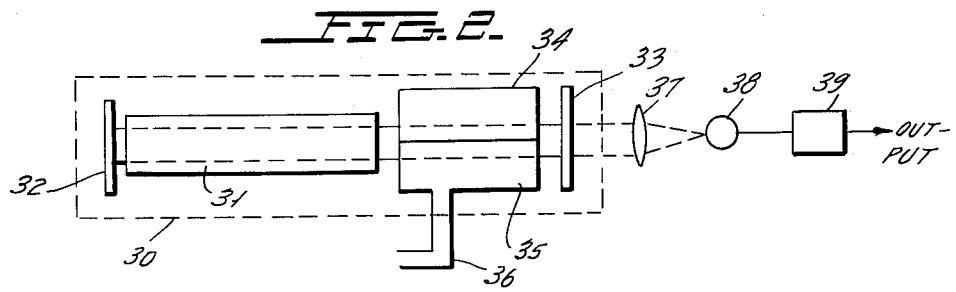
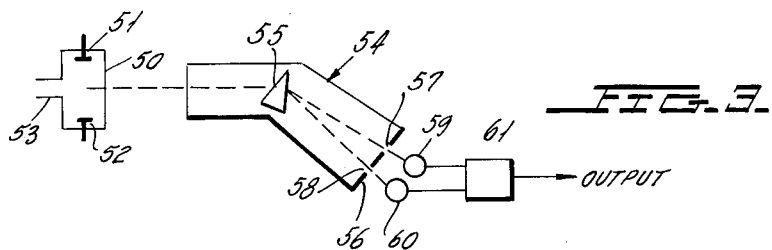
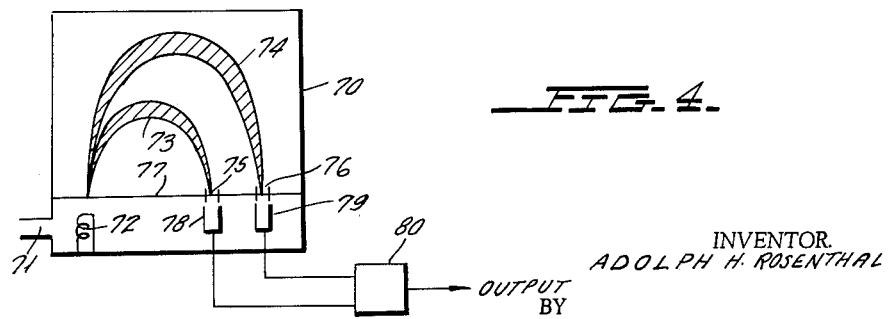
INVENTOR.
ADOLPH H. ROSENTHAL
BY
OSTROLENK, FABER, GERB & SOFFEN
ATTORNEYS

INVENTOR.
ADOLPH H. ROSENTHAL
BY
OSTROLENK, FABER, GERB & SOFFEN
ATTORNEYS

United States Patent Office 3,228,246
Patented Jan. 11, 1966

3,228,246
PRESSURE MEASURING DEVICE
Adolph H. Rosenthal, deceased, late of Forest Hills, N.Y., by Lilly S. Rosenthal, executrix, Forest Hills, N.Y., assignor to Kollsman Instrument Corporation, Elmhurst, N.Y., a corporation of New York
Filed Apr. 18, 1963, Ser. No. 274,058
1 Claim. (Cl. 73—388)

This invention relates to a novel pressure measuring device, and more specifically relates to a pressure measuring device wherein the pressure to be measured is applied to an interferometer or spectrometer, or the like, so that the operation of such an instrument is altered.

Pressure measuring devices are well known to the art, and generally require a movable mechanical element which moves responsive to pressure changes. Such devices are widely used in altimeters for aircraft and other similar equipment.

The principle of the present invention is to provide a novel pressure measuring device which can be used as an altimeter wherein gas pressures to be measured are applied directly to instruments whose operation is responsive to quantity of gas within the instrument and is independent of movable parts. By way of example, the instrument may be an interferometer wherein a fringe shift will occur when the pressure internally of the interferometer and, thus, the index of refraction is changed.

In a similar manner, in an optical maser, a change in pressure within the maser cavity will cause a substantial change in the beat frequency between the output light of that chamber and of a chamber which has a fixed pressure therein.

In a further embodiment of the invention, the pressure of the gas to be measured may be determined by ionizing the gas and applying it to an appropriate spectrometer which can measure the concentration level of a particular constituent part of the gas, or can compare the ratios of concentration of the two different constituent parts of the gas to thus determine the altitude at which such concentrations or ratios will exist.

While the invention has particular application to altimeter-type instrument, it will be observed that the invention has a broader scope of use and could, for example, be used as a microphone wherein the sounds to be detected by the microphone are applied to the pressure input of the instrument. A microphone constructed according to the present invention will have very good characteristics in that no movable diaphragm or the like need be moved by the sound waves to be detected, and only the air itself need be moved.

Accordingly, a primary object of this invention is to provide a novel pressure measuring device.

A further object of this invention is to provide a novel pressure measuring device which has no moving parts.

Another object of this invention is to provide a novel pressure measuring means having no moving parts which is automatically compensated against the effects of temperature change and acceleration.

Still another object of this invention is to utilize the effect of change in index of refraction in the cavity of an optical instrument to determine pressure.

A still further object of this invention is to directly measure the concentration of at least one constituent element of a gas to determine the pressure of the gas.

Another object of this invention is to provide a novel pressure measuring system which is free from hysteresis, inertia and drift.

A still further object of this invention is to provide a novel altitude measuring device which is operable from sea level to altitudes of several thousand miles.

These and other objects of this invention will become apparent from the following description when taken in connection with the drawings, in which:

FIGURE 1 schematically illustrates a first embodiment of the invention where the pressure is measured by means of an interferometer.

FIGURE 2 shows a second embodiment of the invention wherein the pressure to be measured is applied to one portion of an optical maser cavity.

FIGURE 3 shows another embodiment of the invention wherein the gas whose pressure is to be measured is ionized and quantitatively measured in an optical spectrometer.

FIGURE 4 illustrates the manner in which the invention may be applied to a mass spectrometer.

Figure 5:
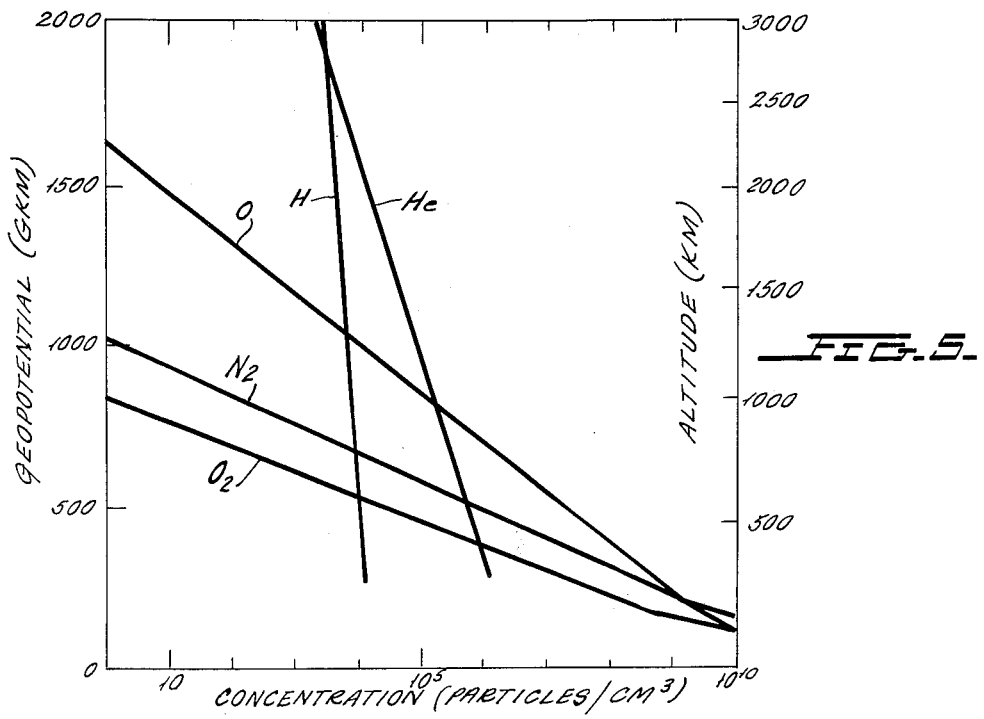
FIGURE 5 illustrates the manner in which the concentration of various constituents of air vary in concentration with altitude.

Referring first to FIGURE 1, I have illustrated therein a pressure measuring device which could be used either as a microphone or altimeter, or any other desired device. In FIGURE 1, I have illustrated a first and second interferometer 10 and 11 respectively which are each of the Fabry-Perot type. Thus, interferometer 10 has a pair of partially silvered mirrors 12 and 13, while interferometer 11 has a siimlar pair of partially silvered mirrors 14 and 15.

The two interferometer structures are contained within two respective sealed housings where interferometer 10 has some fixed pressure therein. The interferometer 11, however, is connected to a conduit 16 to which the gas whose pressure is to be measured is applied. Where the device is to be used as an altimeter, the conduit 16 will be connected to appropriate static pressure measuring ports in an aircraft in the usual manner.

An auxiliary light source 17 is then mounted along with light splitting mirrors 18, 19, 20 and 21 to provide two input light beams, shown in dotted lines 22 and 23 respectively for interferometers 10 and 11 respectively. The output fringes of each of interferometers 10 and 11 are directed toward the output photocells 24 and 25 respectively. The difference in output between these two cells is then measured in an appropriate comparator circuit 26 which, in turn, generates an output which will drive an appropriate indicating structure which could be analog or digital in nature.

In operation, the fringe shift of interferometer 10 will be caused solely by those conditions not associated with change in external pressure. Thus, the change in fringe shift could be caused because of temperature changes or mechanical changes of the cavities, such as those due to acceleration or other similar external influences. These same influences are equally applied to interferometer 11 so that the fringe shifts due solely to such external influences will be equally balanced out in the comparator 26. However, the interferometer 10 also generates fringe shifts due to the change in pressure of the gases applied to conduit 26. Thus, the output of comparator 26 can be a direct measure of these fringe shifts, and thus the index of refraction or pressure of gases applied to conduit 16. Therefore, the unit of FIGURE 1 may be directly applied to highly accurate altimeter duty or any other type duty which involves the measurement of varying pressures. By way of example, when used as an altimeter, with an 8-inch interferometer, a 10-foot change in altitude can produce a fringe shift of the order of $\frac{1}{10}$ of a fringe. This is readily detectable by standard fringe shift measuring equipment.

The second embodiment of the invention is illustrated in FIGURE 2. In FIGURE 2, I have schematically illustrated in the dotted lines 30 a typical optical maser using any active maser material 31 and which has the substantially totally reflecting mirror 32 and partially reflecting mirror 33 to define the maser cavity.

In accordance with the invention, the maser within lines 30 is caused to be a regenerative optical maser interferometer. Thus, a first and second chamber 34 and 35 respectively are placed between the active material 31 and the partially transparent mirror 33. Chamber 34 is sealed to some predetermined gas pressure, while the chamber 35 is connected to conduit 36 to which a pressure under investigation may be connected.

The output of the maser is then applied to an appropriate optical system 37 and a photocell 38 which is, in turn, connected to appropriate output circuitry 39.

In operation, where the device is used as an altimeter, altitude changes will result in a change in pressure within chamber 35 and thus a change in its index of refraction. This, in turn, will change the frequency of the maser light which passes through chamber 35 and will lead to a beat frequency between the light passing through chamber 35 and the light passing through chamber 34 when these light beams reach photocell 38. The circuitry 39 can then deliver a digital output, if desired, for altitude measurement or control.

It is to be noted that all physical influences other than pressure will apply equally to chambers 34 and 35 so that there is automatic compensation for effects of temperature, acceleration, etc.

Extremely accurate pressure measurement can be obtained in a system of the type shown in FIGURE 2. By way of example, an altitude change of the order of 1 foot can produce a beat frequency change of the order of 12 megacycles between the beams coming through chambers 34 and 35.

The two above embodiments of the invention are particularly applicable in the relatively low altitude range, for example, up to 100,000 feet. When the altitude to be measured is higher than this, the relative change in pressure is small for a per unit change in altitude so that the accuracy of the devices of FIGURES 1 and 2 decreases.

In accordance with the invention, and as specifically shown in FIGURES 3 and 4, such altitude measurement in the high altitude regions may be made by specifically measuring the concentration of one or more constituents of the air. By way of example, FIGURE 3 illustrates an arrangement for a quantitative optical spectrometer type of pressure measuring device. Referring now to FIGURE 3, a test cell 50 having electrodes 51 and 52 therein is provided with an inlet conduit 53 which extends into the gas to be measured. The electrodes 51 and 52 are connectable to an appropriate voltage source which can cause the ionization of whatever gas enters chamber 50.

A prism-type spectrometer 54 is then arranged to receive the light from the gas discharge occurring in chamber 50 and focuses this light on the prism 55 which spreads the light into a spectrum over the surface 56 of spectrometer 54. Appropriate slits such as slits 57 and 58 are arranged in wall 56 to intercept the major spectral lens of the principal atmospheric constituents such as helium and hydrogen respectively.

These spectral components then pass through slits 57 and 58 and are applied to photocells 59 and 60 respectively. The photocells 59 and 60 have their electrical output connected to appropriate circuit means 61 which can determine, from the relative light intensities incident thereupon, the particular altitude related to such intensities.

The information obtained from photocells 59 and 60 is directly related to the concentration of the helium and hydrogen particles in chamber 50. This information can then be used, as shown in FIGURE 5, to give a direct indication of altitude. A direct altitude indication can be provided with relatively high accuracies where the circuitry 61 determines the concentration ratio of two of the gases such as helium and hydrogen whereby this ratio will correspond to some specific altitude.

Clearly, the spectrometer of FIGURE 3 could be used for measuring more than the two gases helium and hydrogen where additional slits could be provided for ozone, oxygen or nitrogen measurements.

A still further embodiment of the invention is illustrated in FIGURE 4 wherein the principle of the mass spectrometer is used. Thus, in FIGURE 4, the mass spectrometer is comprised of an appropriate chamber 70 which has an inlet gas source 71, adjacent an ionizing coil 72. The ionizing coil 72 ionizes the gas in the test chamber, and this gas is then appropriately accelerated in a curved path by means of an appropriate magnetic and/or electric field so that, for example, all hydrogen ions will take the route indicated by shaded area 73, while all helium ions will take the route indicated by shaded path 74.

Appropriate slits such as slits 75 and 76 respectively are located in plate 77 with collectors 78 and 79 contained behind slits 75 and 76. Thus, collectors 78 and 79 will collect all of the hydrogen ions and helium ions respectively which pass through the slits located for ions having the appropriate charge-to-mass ratio. Therefore, collectors 78 and 79 will generate electrical outputs to an appropriate indicating or control circuit 80.

Figure 6:
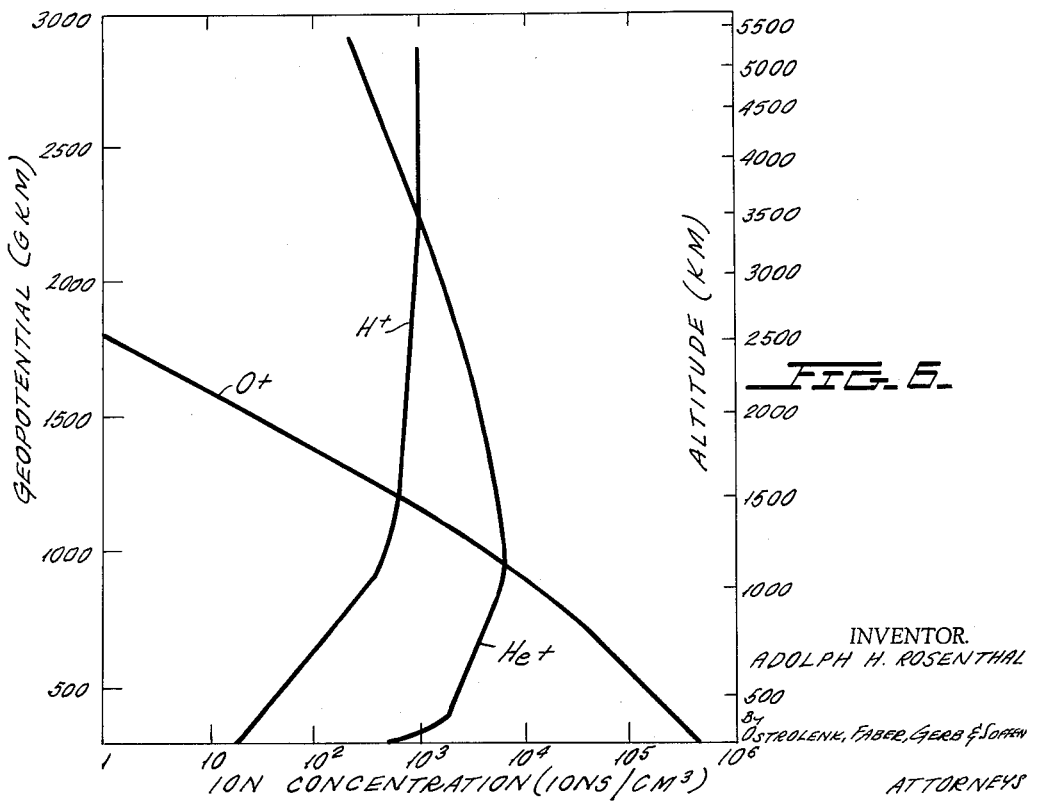
FIGURE 6 illustrates how the ion concentration of some of the constituent gases of air vary with altitude.

The ion concentrations measured, or the ratios of ion concentrations measured, may then provide a direct measure of altitude in accordance with the known data shown in FIGURE 6 for ion concentration of different constituent ions of air as a function of altitude.

Although this invention has been described with respect to its preferred embodiments, it should be understood that many variations and modifications will now be obvious to those skilled in the art, and it is preferred therefore that the scope of this invention be limited not by the specific disclosure herein but only by the appended claims.

What is claimed is:

An altitude measuring device comprising, in combination an optical cavity defined between a first totally reflecting mirror and a second partially transparent mirror; said first and second mirrors spaced from one another and parallel to one another; a maser material interposed between said first and second mirrors and extending along at least a portion of an optical axis defined by said first and second mirrors: first and second closed volumes adjacent one another and extending along at least a portion of said optical axis and lying on opposite sides of said optical axis; said first closed volume being sealed to contain a fixed pressure; and a conduit extending from said second closed volume to the external atmosphere whereby the pressure within said second closed volume is equal to the pressure of said external atmosphere; and means for measuring beat frequencies in the output light of the optical maser defined by said optical cavity, said maser material and said first and second chambers.

References Cited by the Examiner

UNITED STATES PATENTS 2,256,804   9/1941   Hurley _____ 88—14
2,551,544   5/1951   Nier et al. _____ 250—41

OTHER REFERENCES

Barnes, F. S.: On the Modulation of Optical Lasers, Proceedings of the IRE, vol. 50, pages 1686–87, May 1962.

Mullen, P. W.: Modern Gas Analysis, N.Y., Interscience Publishers Inc., 1955. Chapter XVII TP 754 M8.

RICHARD C. QUEISSER, *Primary Examiner.*